(12) United States Patent
Yang et al.

(10) Patent No.: US 12,154,521 B1
(45) Date of Patent: Nov. 26, 2024

(54) METHOD FOR DRIVING LED BACKLIGHT DRIVING CIRCUIT BASED ON LOW-POTENTIAL-END SWITCH CONTROL

(71) Applicant: X-SIGNAL INTEGRATED CO., LTD., Beijing (CN)

(72) Inventors: Guanou Yang, Beijing (CN); Jing Wang, Beijing (CN); Lingxin Kong, Beijing (CN)

(73) Assignee: X-SIGNAL INTEGRATED CO., LTD., Beijing (CN)

( * ) Notice: Subject to any disclaimer, the term of this patent is extended or adjusted under 35 U.S.C. 154(b) by 0 days.

(21) Appl. No.: 18/776,274

(22) Filed: Jul. 18, 2024

Related U.S. Application Data

(63) Continuation of application No. PCT/CN2022/136047, filed on Dec. 2, 2022.

(30) Foreign Application Priority Data

Feb. 7, 2022 (CN) .......................... 202210115393.5

(51) Int. Cl.
*G09G 3/32* (2016.01)
*G09G 3/34* (2006.01)
*H05B 45/48* (2020.01)

(52) U.S. Cl.
CPC ............... *G09G 3/342* (2013.01); *G09G 3/32* (2013.01); *H05B 45/48* (2020.01); *G09G 2320/0233* (2013.01); *G09G 2320/0257* (2013.01)

(58) Field of Classification Search
CPC ......... H05B 45/44; H05B 45/46; H05B 45/48
See application file for complete search history.

(56) References Cited

U.S. PATENT DOCUMENTS

| 10,043,493 | B2 * | 8/2018 | Loo .......................... H05B 45/20 |
| 2011/0062872 | A1 * | 3/2011 | Jin .......................... H05B 45/46 |
| | | | 257/E21.531 |
| 2011/0193605 | A1 * | 8/2011 | Zhao ....................... H05B 45/37 |
| | | | 327/175 |

(Continued)

FOREIGN PATENT DOCUMENTS

| CN | 204119593 U | 1/2015 |
| CN | 210325157 U | 4/2020 |

(Continued)

*Primary Examiner* — Sepehr Azari
(74) *Attorney, Agent, or Firm* — Bayramoglu Law Offices LLC

(57) ABSTRACT

An LED backlight driving circuit based on low-potential-end switch control and a backlight driving method are provided. The LED backlight driving circuit includes a plurality of LED strings, a channel control switch device, a constant current module, a channel switching control module, a signal control unit, and an SPI interface unit. Each of the LED strings has a high-potential-end directly connected to an LED driving voltage $V_{LED}$ and a low-potential-end connected to one channel control switch device and one constant current module, and a plurality of channel control switch devices in each group of LED strings are connected to one channel switching control module; and the channel switching control module is used to control the on-state duty cycle of the LED strings in the group.

5 Claims, 3 Drawing Sheets

(56) References Cited

U.S. PATENT DOCUMENTS

| | | | | |
|---|---|---|---|---|
| 2012/0049743 | A1* | 3/2012 | Moskowitz | H05B 45/20 |
| | | | | 315/149 |
| 2013/0063036 | A1* | 3/2013 | Li | H05B 45/46 |
| | | | | 315/192 |
| 2013/0175934 | A1* | 7/2013 | Fujita | H05B 45/14 |
| | | | | 315/186 |
| 2013/0271019 | A1* | 10/2013 | Tsai | H05B 45/3725 |
| | | | | 315/192 |
| 2014/0042919 | A1* | 2/2014 | Yang | H05B 45/38 |
| | | | | 315/186 |
| 2016/0255693 | A1* | 9/2016 | Wang | H05B 45/395 |
| | | | | 315/185 R |
| 2016/0302270 | A1* | 10/2016 | Wang | H05B 45/10 |
| 2017/0231046 | A1* | 8/2017 | Li | G09G 3/006 |
| 2019/0197969 | A1* | 6/2019 | Liu | G09G 3/3426 |
| 2019/0266963 | A1 | 8/2019 | Verbeure | |
| 2021/0100079 | A1* | 4/2021 | Vollmer | H05B 45/46 |

FOREIGN PATENT DOCUMENTS

| | | |
|---|---|---|
| CN | 111654948 A | 9/2020 |
| CN | 113630929 A | 11/2021 |
| CN | 114420063 A | 4/2022 |

\* cited by examiner

METHOD FOR DRIVING LED BACKLIGHT DRIVING CIRCUIT BASED ON LOW-POTENTIAL-END SWITCH CONTROL

CROSS REFERENCE TO THE RELATED APPLICATIONS

This application is the continuation application of International Application No. PCT/CN2022/136047, filed on Dec. 2, 2022, which is based upon and claims priority to Chinese Patent Application No. 202210115393.5, filed on Feb. 7, 2022, the entire contents of which are incorporated herein by reference.

TECHNICAL FIELD

The present invention relates to the field of light-emitting diode (LED) display technology, and in particular to an LED backlight driving circuit based on low-potential-end switch control and a driving method.

BACKGROUND

LED backlight drive in the prior art generally adopts a direct drive mode or a row-column scanning drive mode. FIG. 1 shows LED backlight control in a direct drive mode in the prior art. In the LED backlight driving circuit, each LED string has a positive terminal (high-potential-end) connected to a driving voltage $V_{LED}$, and a negative terminal (low-potential-end) connected to a selector control switch device and a constant current module. Such a LED backlight driving circuit in a direct drive mode has an advantage that it can ensure each LED string to achieve 100% display brightness. Namely, when a certain LED string requires the maximum brightness output, it only needs to control the constant current module to output the maximum working current of the LED string and set the selector control switch device to have a 100% duty cycle. However, the direct drive mode has a very obvious defect that each LED string channel in the LED backlight driving circuit needs to be provided with an independent constant current source module to realize independent control of the LED string channels, which results in extremely high hardware and control costs.

FIG. 2 shows an LED backlight driving circuit using a row-column scanning driving mode in the prior art. In the LED backlight driving circuit, a plurality of LED strings are grouped into one group. For example, as shown in FIG. 2, every 4 LED strings are provided as one group. The high-potential-end of each LED string is provided with a row scanning switch control device, and the low-potential-ends of each group of LED strings share a column scanning control switch device, i.e., a constant current module. The above-mentioned structure realizes a great simplification of the LED backlight driving control circuit and reduces the hardware cost of the LED backlight driving control circuit. However, the LED backlight driving circuit in this mode has very obvious defects. First, since a plurality of LED strings share a constant current source module, in order for each LED string to reach a current value for achieving the maximum brightness, the driving current value of the constant current source used needs to be multiple times the current value required for a single LED string. Additionally, row scanning switching performed at the high-potential-end and column scanning switching at the low-potential-end need to be controlled to match with each other, which greatly increases the difficulty of control. In addition, the large current at the high-potential-end during switching in this LED backlight control mode results in a very obvious "ghosting" (image retention) phenomenon of display, and it is difficult to completely eliminate it even with additional pre-charge control. The most obvious defect is that, in this LED backlight control mode, increasing the brightness of a single LED string separately is impossible, and only the brightness of a group of LED strings can be increased simultaneously. This results in a poor display effect when providing a special local image with a short-term brightness surge (such as an image of explosion) in this LED backlight control mode.

Accordingly, there is an urgent demand in the prior art for a LED backlight driving circuit and a driving method that can achieve individual control of the brightness of each LED string and a low hardware cost.

SUMMARY

It is a technical object of the present invention to achieve individual adjustment of the brightness of each LED string to break through the limitation of the upper limit of the evenly shared duty cycle, and to greatly simplify the complexity of the LED driving circuit to reduce the circuit and drive control costs.

In order to achieve the above technical object, the present invention provides an LED backlight driving circuit based on low-potential-end switch control, the LED backlight driving circuit including a plurality of LED strings 1, a channel control switch device 2, a constant current module 3, a channel switching control module 4, a signal control unit 5, and a serial peripheral interface (SPI) interface unit 6; in which each of the LED strings 1 has a high-potential-end directly connected to an LED driving voltage $V_{LED}$ and a low-potential-end connected to one channel control switch device 2; a plurality of the LED strings 1 form a group of LED strings, each group of LED strings shares one constant current module 3, and a plurality of channel control switch devices 2 in each group of LED strings are connected to one channel switching control module 4; and the channel switching control module 4 is used to control turn-on of the LED strings in the group; and the channel switching control module 4 is connected to the signal control unit 5, and the signal control unit 5 is connected to the SPI interface unit 6; the SPI interface unit 6 receives an external display signal and transmits it to the signal control unit 5, and the signal control unit 5 determines an on-state duty cycle of each LED string in each group of LED strings according to required display brightness, and transmits on-state duty cycle data to the corresponding channel switching control module 4 for controlling the on-state duty cycle of each LED string in each group of LED strings.

In one embodiment, the constant current module 3 uses an IDAC current source or a VDAC voltage source.

Based on the LED backlight driving circuit provided by the present invention, the present invention also provides an LED backlight driving method based on low-potential-end switch control, the method including:

in each group of LED strings, determining required brightness duty cycles of LED strings and the upper limit of an evenly shared duty cycle;

calculating differences between the required brightness duty cycles and the upper limit of the evenly shared duty cycle of each LED string to obtain duty cycle margins;

compensating the duty cycle margins to the LED string of which the required brightness duty cycle exceeds the upper limit of the evenly shared duty cycle, thereby improving display brightness of the LED string.

In one embodiment, when a sum of the duty cycle margins and the upper limit of the evenly shared duty cycle is greater than the required brightness duty cycle of the LED string of which the required brightness duty cycle exceeds the upper limit of the evenly shared duty cycle, an actual on-state duty cycle of the LED string is set to its required brightness duty cycle; and when the sum of the duty cycle margins and the upper limit of the evenly shared duty cycle is less than the required brightness duty cycle of the LED string of which the required brightness duty cycle exceeds the upper limit of the evenly shared duty cycle, the actual on-state duty cycle of the LED string is set to a sum of the duty cycle margin and the upper limit of the evenly shared duty cycle.

In one embodiment, four LED strings are provided as a group, and each of the four LED string has an upper limit of an evenly shared duty cycle of 25%;

the LED string of a first channel has a required brightness duty cycle of $T_1$, and $T_1 > 25\%$;

the LED string of a second channel has a required brightness duty cycle of $T_2$, and $T_2 < 25\%$;

the LED string of a third channel has a required brightness duty cycle of $T_3$, and $T_3 < 25\%$; and the LED string of a fourth channel has a required brightness duty cycle of $T_4$, and $T_4 < 25\%$.

Then, the sum of the duty cycle margins $T_s$ is $(25\% - T_2) + (25\% - T_3) + (25\% - T_4)$;

when $T_s + 25\%$ is greater than $T_1$, the on-state duty cycle of the LED string of the first channel is set to $T_1$; and when $T_s + 25\%$ is less than $T_1$, the on-state duty cycle of the LED string of the first channel is set to $T_s + 25\%$.

Based on the LED backlight driving circuit provided by the present invention, the present invention also provides an LED backlight driving method based on low-potential-end switch control, the method including:

in each group of LED strings, determining required brightness duty cycles of LED strings and the upper limit of an evenly shared duty cycle; the LED string of which required brightness duty cycle exceeds the upper limit of the evenly shared duty cycle being designated $L_{max}$, the required brightness duty cycle of the LED string being designated $T_{max}$;

calculating a duty cycle margin $T_q$, the duty cycle margin $T_q$ being $100\% - T_{max}$; and allocating the duty cycle margin $T_q$ to the other LED strings than the LED string $L_{max}$ in proportion to the required brightness duty cycle values thereof.

In one embodiment, four LED strings are provided as a group, and each of the four LED string has an upper limit of an evenly shared duty cycle of 25%;

the LED string of a first channel has a required brightness duty cycle of $T_1$, and $T_1 > 25\%$;

the LED string of a second channel has a required brightness duty cycle of $T_2$, and $T_2 < 25\%$;

the LED string of a third channel has a required brightness duty cycle of $T_3$, and $T_3 < 25\%$; and the LED string of a fourth channel has a required brightness duty cycle of $T_4$, and $T_4 < 25\%$.

Then, the duty cycle margin $T_q$ is $100\% - T_1$;

moreover, the on-state duty cycle of the LED string of the second channel is adjusted to $T_q * T_2 / (T_2 + T_3 + T_4)$;

the on-state duty cycle of the LED string of the third channel is adjusted to $T_q * T_3 / (T_2 + T_3 + T_4)$; and the on-state duty cycle of the LED string of the fourth channel is adjusted to $T_q * T_4 / (T_2 + T_3 + T_4)$.

Based on the LED backlight driving circuit provided by the present invention, the present invention also provides an LED backlight driving method based on low-potential-end switch control, the method including:

in each group of LED strings, determining required brightness duty cycles of LED strings and the upper limit of an evenly shared duty cycle; and allocating the on-state duty cycle of each LED string in each group of LED strings according to a proportional relationship of the required brightness duty cycles of the LED strings in each group of LED strings.

In one embodiment, four LED strings are provided as a group, and each of the four LED string has an upper limit of an evenly shared duty cycle of 25%;

the LED string of a first channel has a required brightness duty cycle of $T_1$, and $T_1 > 25\%$;

the LED string of a second channel has a required brightness duty cycle of $T_2$, and $T_2 < 25\%$;

the LED string of a third channel has a required brightness duty cycle of $T_3$, and $T_3 < 25\%$; and the LED string of a fourth channel has a required brightness duty cycle of $T_4$, and $T_4 < 25\%$.

Then, the on-state duty cycle of the LED string of the first channel is adjusted to $T_1 / (T_1 + T_2 + T_3 + T_4)$;

the on-state duty cycle of the LED string of the second channel is adjusted to $T_2 / (T_1 + T_2 + T_3 + T_4)$;

the on-state duty cycle of the LED string of the third channel is adjusted to $T_3 / (T_1 + T_2 + T_3 + T_4)$; and the on-state duty cycle of the LED string of the fourth channel is adjusted to $T_4 / (T_1 + T_2 + T_3 + T_4)$.

In comparison with the prior art, one or more embodiments of the present invention may have the following advantages:

1. Since several LED strings are provided as a group and share a constant current module, the current structure is greatly simplified as compared with the direct drive mode in the prior art, and the circuit structure cost is saved.

2. In the present invention, since no row scanning switching circuit is provided at the high-potential-end of the LED string, a large current is avoided from being generated during switching, and the image retention phenomenon in the display is eliminated; and additionally, the LED strings in one group can be adjusted to break through the upper limit of the evenly shared duty cycle and achieve a higher brightness.

Other features and advantages of the present invention will be described in the following description, and partly become apparent from the description, or are appreciated by implementation of the present invention. The objects and other advantages of the present invention can be realized and obtained by the configurations particularly indicated in the description, claims, and drawings.

BRIEF DESCRIPTION OF THE DRAWINGS

Accompanying drawings are used to provide further understanding of the present invention and constitute a part of the specification. Along with the embodiments of the present invention, the drawings are used to illustrate the present invention, and is not a limitation of the present invention. In the drawings.

DETAILED DESCRIPTION OF THE EMBODIMENTS

In order to clarify the objects, technical solutions, and advantages of the present invention, the present invention is further described in detail below with reference to the drawings.

Figure 1:
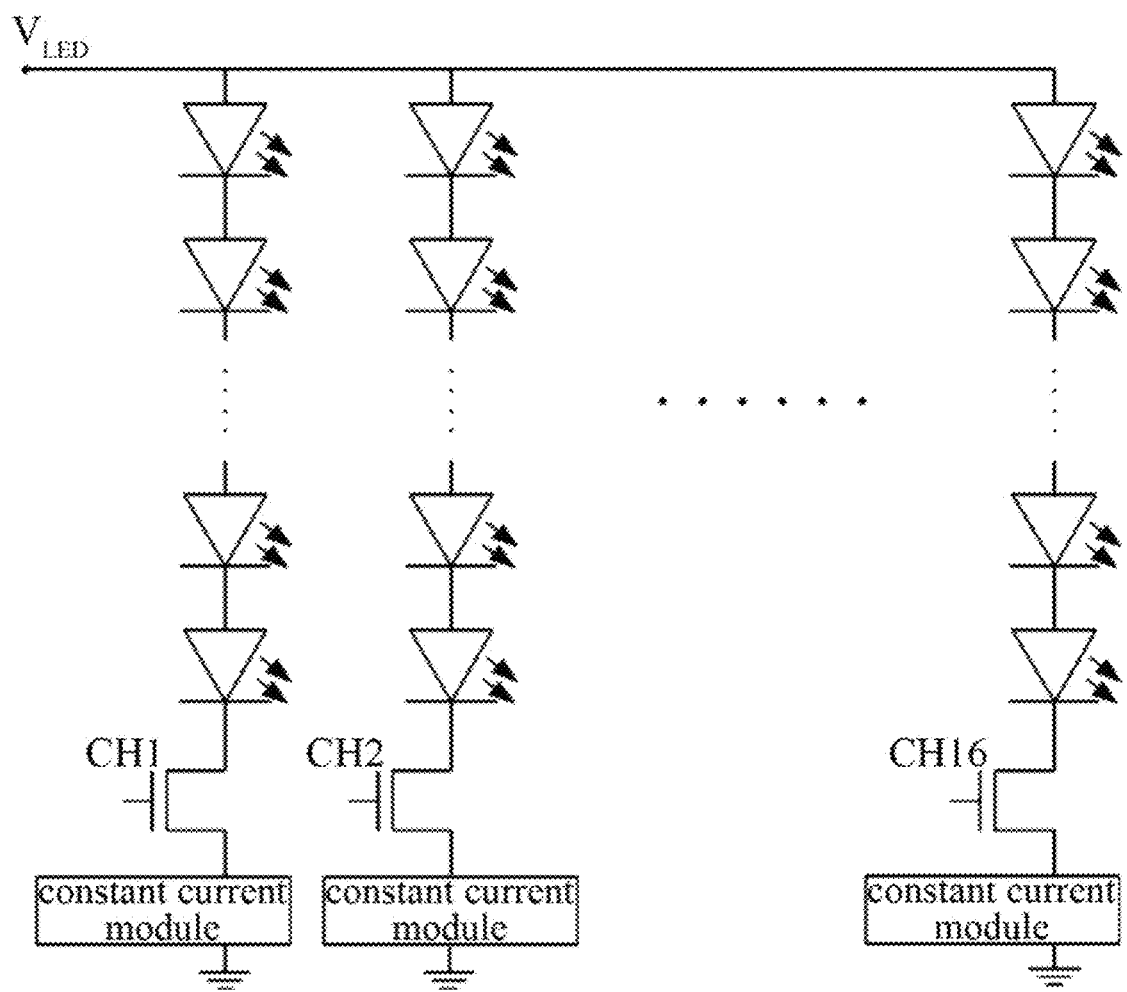
FIG. 1 is a schematic diagram of a LED backlight driving control circuit in the prior art that adopts the direct drive mode.
Figure 2:
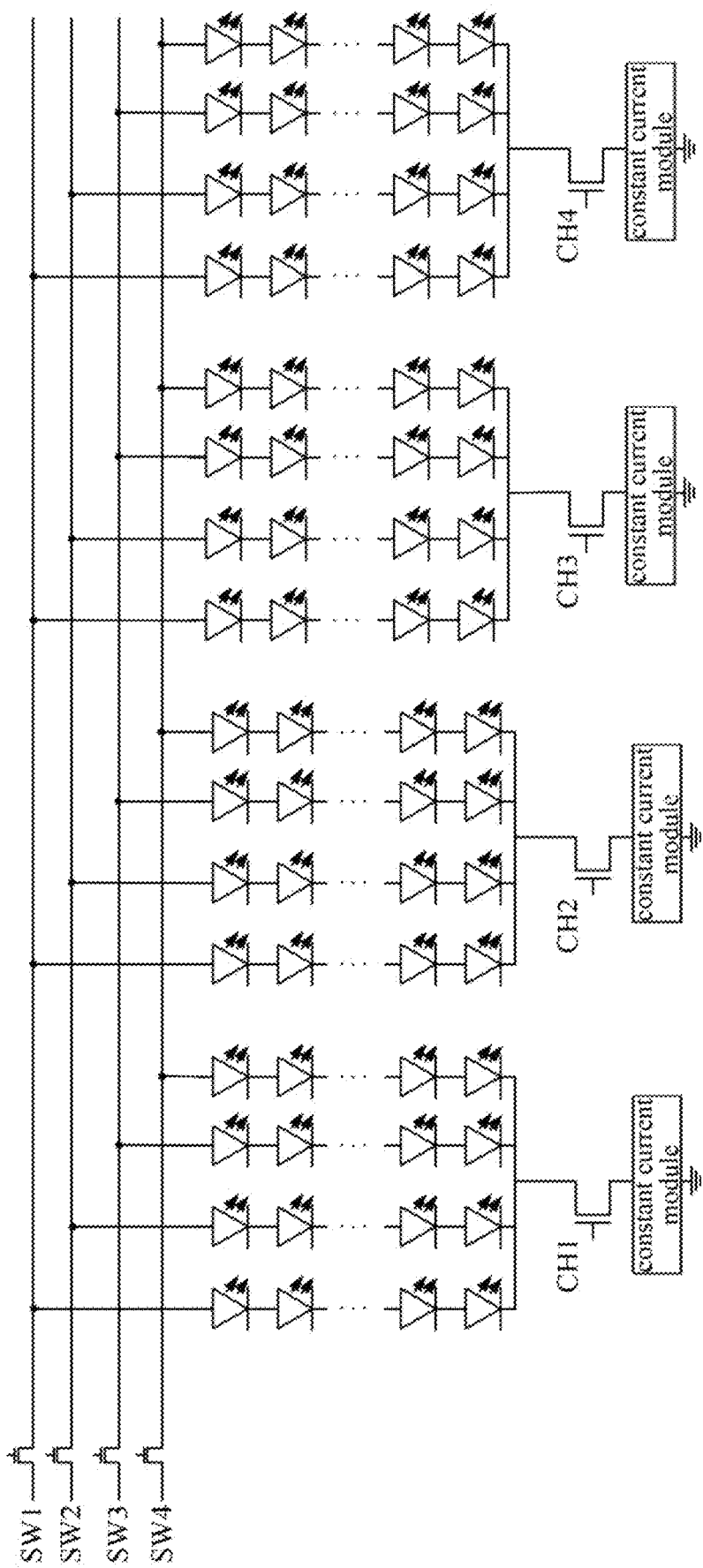
FIG. 2 is a schematic diagram of an LED backlight driving control circuit in the prior art using the row and column scanning mode.
Figure 3:
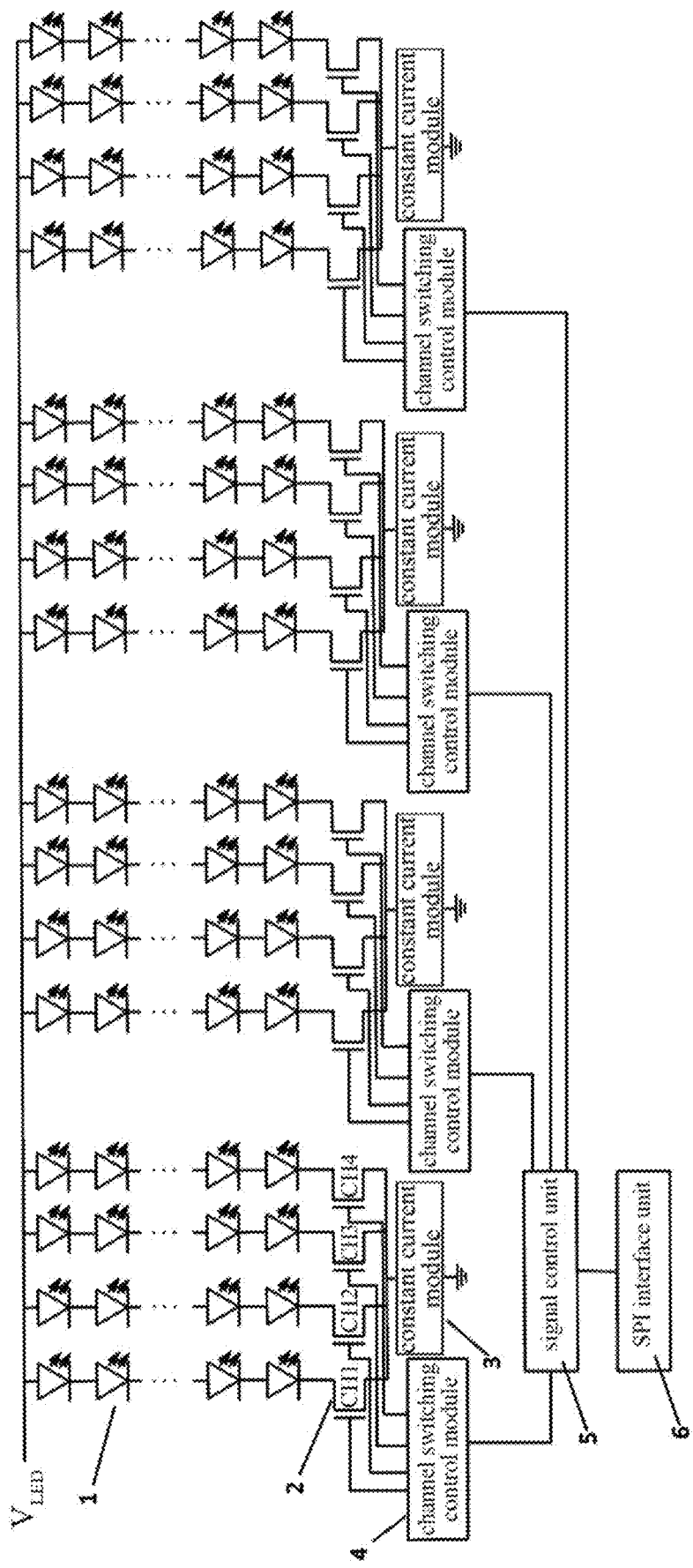
FIG. 3 is a schematic diagram of an LED backlight driving control circuit according to the present invention

FIG. 3 shows an LED backlight driving circuit based on low-potential-end switch control of the present invention. In the present invention, each LED string 1 has a high-potential-end directly connected to a driving voltage $V_{LED}$ and a low-potential-end connected to a channel control switch device 2. A plurality of LED strings 1 are combined to form a group of LED strings, and each group of LED strings shares a constant current module 3. A plurality of channel control switch devices 2 in each group of LED strings are connected to a channel switching control module 4, the channel switching control module 4 is connected to a signal control unit 5, and the signal control unit 5 is connected to an SPI interface unit 6.

Example 1

In the present embodiment, every four LED strings form a group and share one constant current module. Since the four LED strings share the constant current module, when the constant current module is evenly shared by the LED strings of all channels, the upper limit of the evenly shared duty cycle of the LED string in each channel is 25%. The maximum sum of the on-state duty cycles of the LEDs in all the channels is 100%, namely, the maximum sum of the duty cycles of all the four channels sharing the constant current module is 100%.

However, in the LED backlight driving method of the present example, when the required brightness duty cycle of a certain LED string exceeds 25%, a duty cycle margin offered by a LED string having a duty cycle of less than 25% is supplemented to another LED string requiring brightness increase in the same group, thereby allowing the latter LED string to break through the duty cycle limit of 25%.

For example, the brightness requirements of the LED strings of channel 1, channel 2, channel 3, and channel 4 are 35%, 15%, 20%, and 25%, respectively. From the above brightness requirements, it can be seen that the brightness requirement of the LED string of channel 1 exceeds the upper limit of the evenly shared duty cycle, namely, the duty cycle of 25%. The brightness requirements of channel 2 and channel 3 are only 15% and 20%, respectively. That is, channel 2 offers a duty cycle margin of 10%, channel 3 offers a duty cycle margin of 5%, and the total duty cycle margin reaches 15%. The required brightness duty cycle of channel 1 requires only an excess increase of 35%−25%=10%. Hence, when the total duty cycle margin can fully cover the excess increase for the required brightness duty cycle, the channel switching control module 4 increases the on-state duty cycle of channel 1 to 35% and sets the duty cycles of channel 2, channel 3, and channel 4 to 15%, 20%, and 25%, respectively, according to their brightness requirements.

For example, the brightness requirements of the LED strings of channel 1, channel 2, channel 3, and channel 4 are 60%, 15%, 20%, and 25%, respectively. From the above brightness requirements, it can be seen that the brightness requirement of the LED string of channel 1 exceeds the upper limit of the evenly shared duty cycle, namely, the duty cycle of 25%. The brightness requirements of channel 2 and channel 3 are only 15% and 20%, respectively. That is, channel 2 offers a duty cycle margin of 10%, channel 3 offers a duty cycle margin of 5%, and the total duty cycle margin reaches 15%. The required brightness duty cycle of channel 1 requires an excess increase of 60%−25%=35%. In this case, the total duty cycle margin cannot cover the excess increase for the required brightness duty cycle. Therefore, without affecting the brightness requirements of other channels, the highest required brightness duty cycle that can be achieved by channel 1 is 25%+15%=40% only. Hence, the channel switching control module 4 increases the on-state duty cycle of channel 1 to 40% and sets the duty cycles of channel 2, channel 3, and channel 4 to 15%, 20%, and 25%, respectively, according to their brightness requirements.

In the present example, the required brightness duty cycle margins of all the channels are supplemented to a channel with excess required brightness duty cycle, whereby the brightness upper limits of LED strings of some channels are increased to achieve an effect of increasing display brightness.

Example 2

In the present example, similarly to Example 1, every four LED strings form a group and share one constant current module. Since the four LED strings share the constant current module, when the constant current module is evenly shared by the LED strings of all channels, the highest duty cycle of the LED string of each channel that can be achieved is 25%. However, in the LED backlight driving method of the present example, when the brightness requirement of a certain LED string exceeds 25%, a duty cycle margin offered by a LED string having a duty cycle of less than 25% is supplemented to another LED string requiring brightness increase in the same group, thereby allowing the latter LED string to break through the duty cycle limit of 25%.

For example, the brightness requirements of the LED strings of channel 1, channel 2, channel 3, and channel 4 are, 60% 15%, 20%, and 25%, respectively. From the above brightness requirements, it can be seen that the brightness requirement of the LED string of channel 1 exceeds the upper limit of the evenly shared duty cycle, namely, the duty cycle of 25%. The brightness requirements of channel 2 and channel 3 are only 15% and 20%, respectively, and the brightness requirement of channel 4 is exactly the upper limit of the evenly shared duty cycle of 25%.

In the present example, in order to ensure the required brightness duty cycle of channel 1 to reach 60%, the required brightness duty cycles of the other channels 2, 3, and 4 are reduced. The specific reducing method is described as follows. When the required brightness duty cycle of channel 1 is 60%, the total duty cycle of channels 2, 3, and 4 is up to 40%. Therefore, the channel switching control module 4 allocates the duty cycle of 40% to the duty cycles of channels 2, 3, and 4 in the actual display according to the proportion of the required brightness duty cycles thereof.

That is, the duty cycle of channel 2 is 40%*15%/(15%+20%+25%+)=10%;
the duty cycle of channel 3 is 40%*20%/(15%+20%+25%+)=13.3%; and
the duty cycle of channel 4 is 40%*25%/(15%+20%+25%+)=16.7%.

In the LED backlight driving method of the present example, while fully ensuring the requirement of the LED string in need of brightness increase, the brightnesses of the other LED strings are appropriately reduced, whereby the brightness upper limits of LED strings of some channels are increased to achieve an effect of increasing display brightness.

Example 3

In the present example, similarly to Example 1, every four LED strings form a group and share one constant current module. Since the four LED strings share the constant current module, when the constant current module is evenly shared by the LED strings of all channels, the highest duty cycle of the LED string of each channel that can be achieved is 25%. However, in the LED backlight driving method of the present example, when the brightness requirement of a certain LED string exceeds 25%, a duty cycle margin offered by a LED string having a duty cycle of less than 25% is supplemented to another LED string requiring brightness increase in the same group, thereby allowing the latter LED string to break through the duty cycle limit of 25%.

For example, the brightness requirements of the LED strings of channel 1, channel 2, channel 3, and channel 4 are 60%, 15%, 20%, and 25%, respectively. From the above brightness requirements, it can be seen that the brightness requirement of the LED string of channel 1 exceeds the upper limit of the evenly shared duty cycle, namely, the duty cycle of 25%. The brightness requirements of channel 2 and channel 3 are only 15% and 20%, respectively, and the brightness requirement of channel 4 is exactly the upper limit of the evenly shared duty cycle of 25%.

In the present example, the required brightness duty cycles of channel 1, channel 2, channel 3, and channel 4 are reduced in equal proportion, so as to achieve an effect of appropriately increasing the brightness of the LED string of channel 1. The channel switching control module 4 adjusts the on-state duty cycles of channel 1, channel 2, channel 3, and channel 4 according to the following ratios.

That is, the duty cycle of channel 1 is 60%*/(60%+15%+20%+25%+)=50%;
the duty cycle of channel 2 is 15%*/(60%+15%+20%+25%+)=12.5%;
the duty cycle of channel 3 is 20%*/(60%+15%+20%+25%+)=16.7%; and
the duty cycle of channel 4 is 25%*/(60%+15%+20%+25%+)=20.8%.

In the LED backlight driving method of the present example, the required brightness duty cycles of channel 1, channel 2, channel 3, and channel 4 are proportionally reduced, whereby the brightness upper limits of LED strings of some channels are increased so as to break through the upper limit of the evenly shared duty cycle and thus achieve an effect of increasing display brightness.

It can be seen from the description of the examples 1, 2, and 3 described above that adjustment of the on-state duty cycle of the LED string by the driving control of the present invention depends on the LED backlight driving circuit structure of the present invention. The duty cycle adjustment in the above examples of the present invention can only be achieved by providing switch devices and a channel switching control module at the low-potential-ends of the LED strings.

As for the LED driving control circuit in the present invention, since several LED strings are provided as a group and share a constant current module, the current structure is greatly simplified as compared with the direct drive mode in the prior art, and the circuit structure cost is saved.

Also, since no row scanning switching circuit is provided at the high-potential-end of the LED string, a large current is avoided from being generated during switching, and the image retention phenomenon in the display is eliminated; and additionally, the LED strings in one group can be adjusted to break through the upper limit of the evenly shared duty cycle and achieve a higher brightness.

The above description is merely a specific example of the present invention, and the protective scope of the present invention is not limited thereto. Any modification or replacement of the present invention made by those skill in the art within the technical specifications described in the present invention should fall within the protective scope of the present invention.

What is claimed is:

1. A light-emitting diode (LED) backlight driving method for an LED backlight driving circuit based on low-potential-end switch control, wherein
the LED backlight driving circuit comprises a plurality of LED strings, a channel control switch device, a constant current module, a channel switching control module, a signal control unit, and a serial peripheral interface (SPI) interface unit;
each of the LED strings has a high-potential-end directly connected to an LED driving voltage $V_{LED}$ and a low-potential-end connected to the channel control switch device; a plurality of the LED strings form a group of LED strings, each group of LED strings shares one constant current module, and a plurality of channel control switch devices in each group of LED strings are connected to one channel switching control module; and the channel switching control module is used to control turn-on of the LED strings in the group; and
the channel switching control module is connected to the signal control unit, and the signal control unit is connected to the SPI interface unit; the SPI interface unit receives an external display signal and transmits the external display signal to the signal control unit, and the signal control unit determines an on-state duty cycle of each LED string in each group of LED strings according to required display brightness, and transmits on-state duty cycle data to the corresponding channel switching control module for controlling the on-state duty cycle of each LED string in each group of LED strings;
wherein the LED backlight driving method comprises:
in each group of LED strings, determining required brightness duty cycles of LED strings and an upper limit of an evenly shared duty cycle;
calculating differences between the required brightness duty cycles and the upper limit of the evenly shared duty cycle of each LED string to obtain duty cycle margins;
compensating the duty cycle margins to the LED string of which the required brightness duty cycle exceeds the upper limit of the evenly shared duty cycle, thereby improving display brightness of the LED string;
when a sum of the duty cycle margins and the upper limit of the evenly shared duty cycle is greater than the required brightness duty cycle of the LED string of which the required brightness duty cycle exceeds the upper limit of the evenly shared duty cycle, setting an actual on-state duty cycle of the LED string to the required brightness duty cycle of the LED string; and when the sum of the duty cycle margins and the upper limit of the evenly shared duty cycle is less than the required brightness duty cycle of the LED string of which the required brightness duty cycle exceeds the upper limit of the evenly shared duty cycle, setting the actual on-state duty cycle of the LED string to a sum of the duty cycle margin and the upper limit of the evenly shared duty cycle.

2. The LED backlight driving method according to claim 1, wherein four LED strings are provided as a group, and each of the four LED strings has an upper limit of an evenly shared duty cycle of 25%;

the LED string of a first channel has a required brightness duty cycle of $T_1$, and $T_1 > 25\%$;

the LED string of a second channel has a required brightness duty cycle of $T_2$, and $T_2 < 25\%$;

the LED string of a third channel has a required brightness duty cycle of $T_3$, and $T_3 < 25\%$; and the LED string of a fourth channel has a required brightness duty cycle of $T_4$, and $T_4 < 25\%$;

then, the sum of the duty cycle margins $T_s$ is $(25\% - T_2) + (25\% - T_3) + (25\% - T_4)$;

when $T_s + 25\%$ is greater than $T_1$, the on-state duty cycle of the LED string of the first channel is set to $T_1$; and when $T_s + 25\%$ is less than $T_1$, the on-state duty cycle of the LED string of the first channel is set to $T_s + 25\%$.

3. An LED backlight driving method for an LED backlight driving circuit based on low-potential-end switch control, wherein the LED backlight driving circuit comprises a plurality of LED strings, a channel control switch device, a constant current module, a channel switching control module, a signal control unit, and an SPI interface unit;

each of the LED strings has a high-potential-end directly connected to an LED driving voltage $V_{LED}$ and a low-potential-end connected to the channel control switch device; a plurality of the LED strings form a group of LED strings, each group of LED strings shares one constant current module, and a plurality of channel control switch devices in each group of LED strings are connected to one channel switching control module; and the channel switching control module is used to control turn-on of the LED strings in the group; and the channel switching control module is connected to the signal control unit, and the signal control unit is connected to the SPI interface unit; the SPI interface unit receives an external display signal and transmits the external display signal to the signal control unit, and the signal control unit determines an on-state duty cycle of each LED string in each group of LED strings according to required display brightness, and transmits on-state duty cycle data to the corresponding channel switching control module for controlling the on-state duty cycle of each LED string in each group of LED strings;

wherein the LED backlight driving method comprises:

in each group of LED strings, determining required brightness duty cycles of LED strings and an upper limit of an evenly shared duty cycle; the LED string of which required brightness duty cycle exceeds the upper limit of the evenly shared duty cycle being designated $L_{max}$; the required brightness duty cycle of the LED string being designated $T_{max}$;

calculating a duty cycle margin $T_q$, the duty cycle margin $T_q$ being $100\% - T_{max}$; and allocating the duty cycle margin $T_q$ to the other LED strings than the LED string $L_{max}$ in proportion to the required brightness duty cycle values of the other LED strings.

4. The LED backlight driving method according to claim 3, wherein four LED strings are provided as a group, and each of the four LED strings has an upper limit of an evenly shared duty cycle of 25%;

the LED string of a first channel has a required brightness duty cycle of $T_1$, and $T_1 > 25\%$;

the LED string of a second channel has a required brightness duty cycle of $T_2$, and $T_2 < 25\%$;

the LED string of a third channel has a required brightness duty cycle of $T_3$, and $T_3 < 25\%$; and the LED string of a fourth channel has a required brightness duty cycle of $T_4$, and $T_4 < 25\%$;

then, the duty cycle margin $T_q$ is $100\% - T_1$;

the on-state duty cycle of the LED string of the second channel is adjusted to $T_q * T_2 / (T_2 + T_3 + T_4)$;

the on-state duty cycle of the LED string of the third channel is adjusted to $T_q * T_3 / (T_2 + T_3 + T_4)$; and the on-state duty cycle of the LED string of the fourth channel is adjusted to $T_q * T_4 / (T_2 + T_3 + T_4)$.

5. An LED backlight driving method for an LED backlight driving circuit based on low-potential-end switch control, wherein the LED backlight driving circuit comprises a plurality of LED strings, a channel control switch device, a constant current module, a channel switching control module, a signal control unit, and an SPI interface unit;

each of the LED strings has a high-potential-end directly connected to an LED driving voltage $V_{LED}$ and a low-potential-end connected to the channel control switch device; a plurality of the LED strings form a group of LED strings, each group of LED strings shares one constant current module, and a plurality of channel control switch devices in each group of LED strings are connected to one channel switching control module; and the channel switching control module is used to control turn-on of the LED strings in the group; and the channel switching control module is connected to the signal control unit, and the signal control unit is connected to the SPI interface unit; the SPI interface unit receives an external display signal and transmits the external display signal to the signal control unit, and the signal control unit determines an on-state duty cycle of each LED string in each group of LED strings according to required display brightness, and transmits on-state duty cycle data to the corresponding channel switching control module for controlling the on-state duty cycle of each LED string in each group of LED strings;

wherein the LED backlight driving method comprises:

in each group of LED strings, determining required brightness duty cycles of LED strings and an upper limit of an evenly shared duty cycle; and allocating the on-state duty cycle of each LED string in each group of LED strings according to a proportional relationship of the required brightness duty cycles of the LED strings in each group of LED strings; wherein four LED strings are provided as a group, and each of the four LED strings has an upper limit of an evenly shared duty cycle of 25%;

the LED string of a first channel has a required brightness duty cycle of $T_1$, and $T_1 > 25\%$;

the LED string of a second channel has a required brightness duty cycle of $T_2$, and $T_2 < 25\%$;

the LED string of a third channel has a required brightness duty cycle of $T_3$, and $T_3 < 25\%$; and the LED string of a fourth channel has a required brightness duty cycle of $T_4$, and $T_4 < 25\%$;

then, the on-state duty cycle of the LED string of the first channel is adjusted to $T_1/(T_1+T_2+T_3+T_4)$;

the on-state duty cycle of the LED string of the second channel is adjusted to $T_2/(T_1+T_2+T_3+T_4)$;

the on-state duty cycle of the LED string of the third channel is adjusted to $T_3/(T_1+T_2+T_3+T_4)$; and the on-state duty cycle of the LED string of the fourth channel is adjusted to $T_4/(T_1+T_2+T_3+T_4)$.

* * * * *